No. 861,501. PATENTED JULY 30, 1907.
W. L. CASE.
VALVE LOCKING DEVICE.
APPLICATION FILED FEB. 5, 1906.
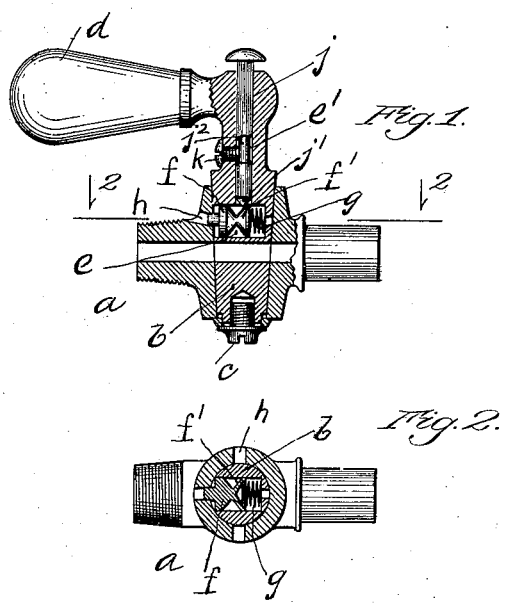

UNITED STATES PATENT OFFICE.

WILLIS L. CASE, OF NEW BRITAIN, CONNECTICUT.

VALVE-LOCKING DEVICE.

No. 861,501.  Specification of Letters Patent.  Patented July 30, 1907.

Application filed February 5, 1906. Serial No. 299,393.

*To all whom it may concern:*

Be it known that I, WILLIS L. CASE, a citizen of the United States of America, residing at New Britain, in the county of Hartford and State of Connecticut, have invented certain new and useful Improvements in Valve-Locking Devices, of which the following is a specification.

My device relates to improvements in valves and particularly to devices for locking the valve in open and closed positions.

Figure 1 is a side elevation view. Fig. 2 is a top view showing cross section of Fig. 1 at 2—2.

The valve proper consists of the usual valve body $a$, a valve plug $b$ secured in place by the screw $c$, and the handle $d$. The valve plug has the lateral chamber $e$; a passage $e'$ extends vertically from the top of the plug down into the chamber $e$. A detent $f$ having a cam surface $f'$, which is shown as being formed by a circumferential groove having inclined sides, is located in the chamber $e$. A spring $g$ located in the chamber $e$ back of the detent normally forces it radially outward. In the inner walls of said valve body are recesses $h$ into which the detent is forced at open and closed positions of the valve by the spring $g$. When the valve is locked the cam surface $f'$ lies underneath the vertical passage $e'$. In this vertical passage there is located a plunger $j$ whose lower end is tapered as at $j'$ to engage the cam surface $f'$ so that when it is pressed down the tapered end of the plunger rides down the cam surface retracting the detent and compressing the spring $g$ so that the valve plug may be free to turn. When the plunger is released the spring $g$ forces the detent outward and into the recess when the valve is in open or closed position.

In order to prevent accidental withdrawal of the plunger it is reduced in diameter as at $j^2$, the end of a set-screw $k$ riding in said reduced portion.

I claim as my invention:

1. A valve locking device comprising the body having a plug orifice, a plug in said orifice, a radially movable detent carried by said plug and adapted to engage recesses in the body to lock the plug in the open and closed position of the valve, a spring normally forcing said detent into engagement with said body, and a vertically movable plunger coöperating with said detent to disengage it from said body.

2. A valve locking device comprising the body having a plug orifice, a plug in said orifice, a radially movable detent carried by said plug and adapted to engage recesses in the body to lock the plug in open and closed positions, a spring acting on said detent to normally force it into engagement with the body, a cam face on said detent, and a vertically movable plunger coöperating with said cam face to retract the detent, substantially as described.

3. A valve locking device comprising the body having a plug orifice and recesses in the walls thereof, a plug, a radially movable detent carried thereby and adapted to enter said recesses to lock the valve, a spring acting on said detent to normally force it into engagement with said recesses, and a vertically movable plunger for retracting said detent.

4. A valve locking device comprising the body having a plug orifice, recesses arranged radially in the walls thereof, a plug, a radially movable detent carried by said plug and normally forced by a spring to enter said recesses to lock the valve, said spring, a circumferential groove about said detent forming a cam face, and a vertically movable plunger having a tapered end coöperating with said cam face on the detent to retract said detent against the force of said spring to unlock said plug, substantially as described.

In testimony whereof I affix my signature in presence of two witnesses.

WILLIS L. CASE.

Witnesses:
A. S. PARSONS,
A. J. SLOPER.